(12) United States Patent
Cong

(10) Patent No.: US 8,889,232 B2
(45) Date of Patent: Nov. 18, 2014

(54) RADIATION CURABLE INK COMPOSITIONS

(75) Inventor: Lianhui Cong, Northfield, NH (US)

(73) Assignee: Electronics for Imaging, Inc., Fremont, CA (US)

( * ) Notice: Subject to any disclaimer, the term of this patent is extended or adjusted under 35 U.S.C. 154(b) by 856 days.

(21) Appl. No.: 12/544,955

(22) Filed: Aug. 20, 2009

(65) Prior Publication Data

US 2011/0045199 A1    Feb. 24, 2011

(51) Int. Cl.
  C08F 2/46    (2006.01)
  C09D 11/101  (2014.01)
  C09D 4/06    (2006.01)
  C08F 2/48    (2006.01)

(52) U.S. Cl.
  CPC .......... C08F 2/48 (2013.01); C09D 11/101 (2013.01); C09D 4/06 (2013.01)
  USPC .......... 427/487; 427/385.5; 427/508; 347/100

(58) Field of Classification Search
  USPC .......... 427/385.5, 487, 508; 347/100
  See application file for complete search history.

(56) References Cited

U.S. PATENT DOCUMENTS

| 7,365,105 | B2 | 4/2008 | Kiefer-Liptak |
| 2006/0014852 | A1 | 1/2006 | Loccufier et al. |
| 2008/0090929 | A1* | 4/2008 | Wilson et al. .......... 522/75 |
| 2008/0090930 | A1 | 4/2008 | Madhusoodhanan et al. |
| 2008/0226833 | A1 | 9/2008 | Kiefer-Liptak |
| 2010/0256255 | A1* | 10/2010 | Stevens .......... 522/182 |

FOREIGN PATENT DOCUMENTS

| EP | 1375569 | 1/2004 |
| WO | WO9929787 | 6/1999 |

OTHER PUBLICATIONS

International Search Report and Written Opinion mailed Oct. 21, 2010 in parallel PCT application No. PCT/US10/45348,11 pages.

* cited by examiner

Primary Examiner — Robert S. Walters, Jr.
(74) Attorney, Agent, or Firm — Michael A. Glenn; Perkins Coie LLP

(57) ABSTRACT

The radiation curable ink compositions exhibit fasting curing, high flexibility and good adhesion to a broad range of substrates. The ink compositions include a dendritic or hyperbranched polyester acrylate component, which is present in an amount of 10-45% by weight and has a functionality of greater than 5. The compositions further include an oligomer component, a monomer component, a photoinitiator component, a colorant component, and an additive component. The compositions have a viscosity of not greater than 40 cP at 25° C. The radiation curable compositions are suitable for inkjet printing on a variety of substrates.

18 Claims, No Drawings

RADIATION CURABLE INK COMPOSITIONS

BACKGROUND OF THE INVENTION

1. Technical Field

The invention relates generally to the field of ink compositions. More specifically, the invention relates to radiation curable ink compositions comprising a dendritic or hyperbranched polyester acrylate component.

2. Description of the Related Art

Radiation curable inks, e.g. for wide and super-wide inkjet printing have been known for some time. Ink compositions, however, have substantial problems meeting the increased demand for high performance inkjet ink, especially for the ink with fast curing speed, adhesion to a broad range of substrates, good resistance, and good flexibility.

Radiation curable inks are generally composed of monomeric and oligomeric materials, pigments, initiators, and additives, and optionally, a small amount of solvent. Radiation curable inks are printed on numerous substrates, both rigid and flexible, e.g. polyvinyl chloride (PVC), polystyrene, polycarbonate, acrylonitrile-butadiene-styrene (ABS), polyester, polyolefins, and textile materials. The ink performance, e.g. adhesion, scratch and rub resistance, flexibility, hardness, etc. are highly dependent on the ink compositions, especially the properties of the monomeric and oligomeric materials used in the ink compositions. Some existing radiation curable ink compositions are found to have low adhesion, which results in premature peeling or flaking of ink film from substrates. In addition, some ink compositions show poor flexibility on flexible substrates when folded or wrinkled as evidenced by cracking. The limited ability of ink compositions to adhere to a variety of substrates is increasingly problematic as the demand for using ink on a greater variety of substrates increases.

Existing radiation curable inks are generally based on (meth)acrylates and formulated by using mono-functional (meth)acrylate monomers as diluents and difunctional, tri-functional, or higher functional (meth)acrylate monomers as cross-linking agents to ensure that inks are cured with a certain amount of UV energy. Additional descriptions of (meth)acrylates can be found in WO 99/29787.

In existing ink compositions, low viscosity tri-functional or higher functional monomers are generally used to formulate fast curing inks where the ink dot is rapidly dried or cured after ejection from the nozzles of printing heads and deposited on the substrates using a small amount of radiation energy. These higher functional monomers sacrifice flexibility and adhesion for a fast drying capability, which significantly limits the application of the ink. Thus, there is a continuing need for radiation curable inks that have good adhesion to multiple substrates and improved flexibility that is capable of withstanding cracking during application.

U.S. Pat. No. 7,365,105 discloses a high amount of low viscosity tri-functional or higher functional monomers that are used in ink compositions to achieve a fast curing ink. Less than 10% hyperbranched oligomers are used in the ink compositions due to their high viscosity.

EP1375569 discloses radiation-curable mixtures comprising highly-branched polyesters having acrylate terminal groups that form high viscosity paint or ink mixtures where the viscosity is between 100-1000 centipoise (cP).

US 2006/0014852 discloses a radiation curable ink containing a hyperbranched polymer as a photoinitiator to formulate radiation curable inks and coatings.

SUMMARY OF THE INVENTION

The invention generally relates to radiation curable ink compositions for ink-jet printing. The ink compositions comprise a dendritic or hyperbranched polyester acrylate component. The dendritic or hyperbranched polyester acrylate component comprises 10-45% by weight of the ink compositions and the dendritic or hyperbranched polyester acrylate in the component has a functionality of greater than 5.

The ink compositions also comprise an oligomer component. The oligomer component comprises 1-15% by weight of the ink compositions and preferably includes at least one of an acrylic oligomer, a urethane (meth)acrylate oligomer, a polyester based (meth)acrylate oligomer, or a polyether based (meth)acrylate oligomer, an epoxy (meth)acrylate oligomer, etc. An oligomer combined with a hyperbranched polyester acrylate component significantly improves ink adhesion to a wide range of substrates, including substrates that are difficult for radiation curable inkjet inks to adhere to, e.g. polyolefins.

The ink compositions also comprise a monomer component. The monomer component comprises 30-80% by weight, which is selected based on good solvency to the dendritic or hyperbranched polyester acrylate component and the oligomer component used in the ink compositions. The ink compositions are free or substantially free of solvent or other non-reactive diluents. If any solvent or non-reactive diluents are present, they comprise less than 2% by weight of the ink compositions, preferably less than 1% by weight In one embodiment, the ink compositions comprise a dendritic or hyperbranched polyester acrylate component, an oligomer component, a monomer component, a photoinitiator component, and an additive component. The compositions have a viscosity of not greater than 40 cP at 25° C. The compositions are radiation curable to form a cured film having an elongation of about 70% to 200%.

The ink compositions are directed to inkjet printing, which includes the delivery of the ink compositions to a substrate and subsequent exposure of the ink compositions to radiation to cure the ink compositions on the substrates.

DETAILED DESCRIPTION OF THE INVENTION

The invention generally relates to radiation curable ink compositions, which comprise: (1) a dendritic or hyperbranched polyester acrylate component; (2) an oligomer component; (3) a monomer component; (4) a photoinitiator component; (5) a colorant component; and (6) an additive component.

The ink compositions include several chemical materials. These materials share a function or property in the ink compositions that is collectively referred to as a component. A functional group in the invention refers to compounds having unsaturated carbon-carbon groups that can be polymerized by radiation during the curing process to form an ink film Dendritic or Hyperbranched Polyester Acrylate Component A dendritic polymer is built up in stages from building blocks of lower molecular weight. The dendritic polymer forms a repeatedly branched species that is characterized by structural perfection. This is based on the evaluation of both symmetry and polydispersity. In contrast to the dendrimer, a hyperbranched polymer is easy to produce, preferably in a single stage or two stage reactions, but the structure lacks the highly branched symmetric structure.

In contrast to linear polymers, dendritic and hyperbranched polymers have spherical or three-dimensional globular structures that provide more interaction sites, have a low molecular volume for a given molecular weight, and have a high concentration of end groups. Suitable materials than can be employed to form the dendritic or hyperbranched component include, but are not limited to, hyperbranched polyester acrylates under the designations of CN2300, CN2301, CN2302, CN2303, CN2304 from Sartomer®. CN2300, CN2301, CN2302, CN2303, and CN2304 have a functionality of 8, 9, 16, 6, and 18 respectively.

The ink compositions can be cured with a small amount of radiation energy, also known as low dosage or fast curing ink. The fast curing property of the ink compositions described in the invention is critical for high speed printers. Fast curing inks can substantially reduce substrate heating during printing, which broadens the application of the radiation curable ink in inkjet printing to a wide variety of heat sensitive substrates.

An ultraviolet (UV) lamp is generally used to cure radiation curable inks. Infrared (IR) light is a by-product of the UV lamp. IR light substantially heats up and wrinkles the substrate during printing, which affects the quality of the printed images. More UV output from the UV lamp creates more IR output, and more substrate heating.

The dendritic or hyperbranched polyester acrylate component comprises 10-45% by weight of the ink compositions. Preferably, the dendritic or hyperbranched polyester acrylate component comprises 10-30% by weight of the ink compositions, more preferably the dendritic or hyperbranched polyester acrylate component comprises 10-25% by weight of the ink compositions.

The dendritic or hyperbranched polyester acrylate in the component has a functionality of greater than 5. Preferably, the dendritic or hyperbranched polyester acrylate in the component has a functionality of in the range of 6-12.

Oligomer Component

The ink compositions comprise an oligomer component. The amount of the oligomer component in the ink compositions is preferably 1-15% by weight, and more preferably 5-10% by weight. The oligomer component comprises at least one of an acrylic oligomer, a urethane (meth)acrylate oligomer, a polyester based (meth)acrylate oligomer, or a polyether based (meth)acrylate oligomer, an epoxy (meth)acrylate oligomer.

It is preferable to use an oligomer component of low viscosity, low volatility, high reactivity, low glass transition temperature, and good adhesion to multiple substrates in the ink compositions. The functionality of the oligomer component is preferably not greater than 3, and more preferably the functionality of the oligomer component is not greater than 2. The low functionality contributes to more flexible ink compositions. An oligomer component combined with a hyperbranched polyester acrylate component can significantly improve ink adhesion to a wide range of substrates, including substrates that are difficult for radiation curable inkjet inks to adhere to, e.g. polyolefins.

Examples of suitable acrylic oligomers include, but are not limited to, those under the designations of CN820, CN152, and CN146, etc. from Sartomer®. Examples of suitable urethane (meth)acrylates include, but are not limited to, aliphatic and aromatic urethane (meth)acrylates under the designations of CN991, CN929, CN966, CN981, CN9006, CN9007, CN992, CN994, CN997, CN978, CN1963, etc. from Sartomer® and those from Cytek® Surface Specialty under the designations of Ebecryl 8402, Ebecryl 1290, etc.

Examples of suitable polyester or polyether based (meth) acrylate oligomers include, but are not limited to, those under the designations of CN3200, CN 2279, and CN2270, etc. from Sartomer®. Examples of suitable epoxy (meth)acrylates oligomer include, but are not limited to, those under the designations of Ebecryl 3701, Ebecryl 3708, Ebecryl 3200, Ebecryl 3600, etc. from Cytek® Surface Specialty, and CN151 from Sartomer®.

Monomer Component

The ink compositions comprise a monomer component. The amount of the monomer component in the ink compositions is 30-80% by weight, and preferably, 30-60% by weight of the ink compositions. It is preferred that the monomer component offer good solvency to the dendritic or hyperbranched polyester acrylate component and the oligomer component in ink formulations, which dilutes the ink to a low viscosity. It is also preferred that the monomer component has low glass transition temperature, which contributes to the flexibility of ink after curing. The functionality of the monomer is preferably not greater than 2 to create more flexible ink compositions.

In one embodiment, the monomer component comprises both monofunctional and difunctional monomers.

Examples of suitable mono-functional monomers include, but are not limited to, tetrahydrofurfuryl acrylate, tetrahydrofurfuryl methacrylate, vinyl caprolatam, isobornyl acrylate, isobornyl methacrylate, 2-phenoxyethyl acrylate, 2-phenoxyethyl methacrylate, 2-(2-ethoxyethoxy)ethyl acrylate, isooctyl acrylate, isodecyl acrylate, isodecyl methacrylate, lauryl acrylate, lauryl methacrylate, stearyl acrylate, stearyl methacrylate, cyclic trimethylolpropane formal acrylate, 3,3,5-trimethylcyclohexane acrylate, and monofunctional methoxylated PEG (350) acrylate, etc.

Examples of suitable di-functional monomers include, but not are limited to, diacrylates or dimethacrylates of diols and polyetherdiols, such as propoxylated neopentyl glycol diacrylate, 1,6-hexanediol diacrylate, 1,6-hexanediol dimethacrylate, 1,3-butylene glycol diacrylate, 1,3-butylene glycol dimethacrylate 1,4-butanediol diacrylate, 1,4-butanediol dimethacrylate, alkoxylated aliphatic diacrylate (e.g. SR9209A from Sartomer®), diethylene glycol diacrylate, diethylene glycol dimethacrylate, dipropylene glycol diacrylate, tripropylene glycol diacrylate, triethylene glycol dimethacrylate, and alkoxylated hexanediol diacrylates, e.g SR562, SR563, SR564 from Sartomer®.

Photoinitiator Component

The ink compositions comprise a photoinitiator component. In the radiation curing process, the photoinitiator component initiates the curing in response to incident radiation. The amount of a photoinitator component in the ink compositions is 1-20% by weight, and preferably, 5-15% by weight. The selection of the type of the photoinitiator component in the ink compositions is generally dependent on the wavelength of curing radiation and the colorant employed in the ink compositions. It is preferred that the peak absorption wavelengths of selected photoinitiator vary with the range of wavelength of curing radiation to effectively utilize radiation energy, especially using ultraviolet light as radiation.

Examples of suitable photoinitiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2-phenylacetophenone, 2-hydroxy-2-methylpropionphenone, Diphenyl (2,4,6-trimethylbenzoyl) phosphine oxide, bis(2,6-dimethoxy-benzoyl)-2,4,6 trimethyl phenyl phosphine oxide, 2-methyl-1-1[4-(methylthio)phenyl]-2-morpholino-propan-1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6-trimethylbenzophenone, isopropyl thioxanthone. Suitable blends of photoinitiators commercially available include, but are not limited to, those under the designations of Darocur 4265, Irgacure 2022, Irgacure 2100 from Ciba® Specialty Chemicals; and Esacure KT37, Esacure KT55, Esacure KTO046 from Lamberti®).

The photoinitiator component can further comprise a co-initiator. The amount of co-initiator component is 0-15% by weight of the ink compositions, preferably 0-10% by weight of the ink compositions, more preferably 2-7% by weight of ink compositions. The co-initiator component is used to activate photoinitiators to initiate polymerization or is used to improve the surface curing of ink by mitigating oxygen inhibition to free radicals generated by photoinitiators. Examples of suitable co-initiators include, but are not limited to, those under the designations of CN386, CN384, and CN383 from Sartomer® and Ebecryl 7100 from Cytec® Surface Specialty.

Additive Component

In one embodiment of the invention, the ink compositions further comprise an additive component. Various additives can be included in the ink compositions, including a surfactant, a leveling additive, a stabilizer, etc.

A surfactant is used to reduce the surface tension of the ink compositions to improve wetting property of the inks on substrates. The amount of surfactant in the ink compositions is 0.01-2% by weight, and preferably 0.05-0.5% by weight. It is preferred that the surfactant comprises at least one polysiloxane acrylate, also known as a silicone acrylate, which participates in the radiation curing process to be part of cured ink. Examples of a suitable surfactant include, but are not limited to, those under the designations of Tegorad 2200N, Tegorad 2100, and Tegorad 2300 from Goldschmidt® Chemical Corp., and BYK 377, BYK 3510, BYK 307, and BYK 330 from BYK Chemie®.

A leveling additive is used to improve the flowing property of ink to produce a more uniform surface of ink film. The amount of leveling agent in the in compositions is 0.1-2% by weight. Examples of suitable leveling agent include, but are not limited to, those under the designation of BYK 361N, BYK 353, and BYK 354 etc. from BYK Chemie®.

A stabilizer is used to improve shelf life and photolytic stability of ink compositions. Stabilizers in the ink compositions can include an ultraviolet light stabilizer, a free radical scavenger stabilizer, etc. Examples of ultraviolet light stabilizers include ultraviolet absorber stabilizer and hindered amine light stabilizer. These stabilizers are used to improve the outdoor durability and weatherability of cured ink. Commercially available ultraviolet light stabilizers include, but are not limited to, those under the designation of Tinuvin 460, Tinuvin 479, Tinuvin171, Tinuvin 928, Tinuvin123, and Tinuvin 292 from Ciba® Specialty Chemicals, etc. They can be present in the ink compositions in amounts of 0.01%-2% by weight, and more specifically 0.1%-1% by weight.

A free radical scavenger stabilizer is used to improve the stability of ink against heat. Examples of a free radical scavenger include, but are not limited to, hydroquinone, 4-methoxyphenol, hindered phenol, etc. The amount of free radial scavenger stabilizer can be present in ink compositions in 0.05-1% by weight, and more specifically 0.1-0.75% by weight. A small amount is preferably used in the ink compositions to minimize their interference with the radiation curing process.

Colorant Component

The ink compositions further comprise a colorant component if color is desired. The colorant can be pigment, dyes, or a combination of pigment and/or dyes. The amount of colorant component in the ink compositions is in the range of 0-20% by, more preferably 0-8% by weight. A clear coating has 0% colorant.

Examples of suitable Pigments include, but are not limited to, those under the designation of Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60; Pigment Brown 5, Pigment Brown 23, and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 120, Pigment Yellow 128, Pigment Yellow 129, Pigment Yellow 138, Pigment Yellow 139, Pigment Yellow 150, Pigment Yellow 154, Pigment Yellow 156, and Pigment Yellow 175; Pigment Green 1, Pigment Green 7, Pigment Green 10, and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224; Pigment Violet 19, Pigment Violet 23, Pigment Violet 37, Pigment Violet 32, Pigment Violet 42; and Pigment Black 6 or 7 (The Colour Index, Vols. 1-8, by the Society of Dyers and Colourists, Yorkshire, England), Black PB 2 and 5; carbon black; titanium dioxide (including rutile and anatase); zinc sulfide, and the like or a mixture thereof.

If pigment is used in the ink compositions, preferably, the pigment is pre-dispersed prior to incorporation, generally into one or more of the monomer and/or oligomer components used in the ink compositions. Dispersion agents generally are used to improve the stability of dispersion by reducing or avoiding the possibility of pigment particle settling or agglomerating. Examples of suitable dispersion agents include, but are not limited to, those under the designations of Solsperse 32000 from Lubrizol® Advanced Materials, and DisperBYK 111 and DisperBYK180 from Byk Chemie®. The pigment in the dispersion can be 20-80% by weight. Other additives such as stabilizers, flowing additive, etc. can be incorporated during the dispersion process to improve the stability of dispersion.

The ink compositions have viscosity suitable for ink-jet printing. They have a viscosity is not greater than 40 cP at 25° C. Preferably, the viscosity is not greater than 30 cP at 25° C.

Application

The ink compositions can be printed on an ink jet printer. Any conventional ink jet printer is acceptable.

In one embodiment, the ink jet printer includes a component for radiation curing of the ink. In another embodiment, the radiation curing component is a separate assembly. Non-limiting examples of suitable radiation sources for UV curing include high-pressure or low-pressure mercury vapor lamps, with or without doping, or electron beam sources. Their arrangement is known in principle and may be adapted to the circumstances of the substrate for printing and the process parameters.

EXAMPLES

Curing testing was conducted on a pressure-sensitive-adhesive (PSA) vinyl substrate, DPF2000 produced by Arlon®. The thickness of ink film was 8-10 micrometers prepared using #6 drawdown rod. The ink film was then cured using a medium-pressure mercury vapor lamp.

The elongation was measured using a tensile tester from COM-TEN, Model: 95 Series. The ink sample was cut into strips with 1 inch width, and placed in the two clamps, which was set 3 inches apart. The speed crosshead is 12 inches/min, and the test was stopped when the sample broke. The elongation was measured at the point when the test stopped.

The adhesion measurement was based on ASTM D 3359. The test was conducted by cutting a cross-hatch pattern on the ink sample and applies a suitable tape, e.g. Permacel 99 adhesion test tape from Permacel® over the crosshatch area. The tape was rubbed firmly to remove any trapped air bubbles to ensure full contact, and the tape was then rapidly pulled off close to an angle of 180. The crosshatch area was evaluated based on ASTM D 3359 method B.

Example 1

The example depicts four cyan ink compositions comprising (1) a dendritic or hyperbranched polyester acrylate component; (2) an oligomer component; (3) a monomer component; (4) an additive component; (5) a photoinitiator component; and (6) a pigment component according to one embodiment of the invention. In this example, the ink composition exhibits a viscosity of below 30 cP at 25° C., a fast curing property, and good flexibility with elongation of 100-163%. The ink composition is shown in table 1 and the ink property is shown in table 2.

TABLE 1

Ink Composition

| RAW MATERIALS | | INK COMPOSITION | | | |
| --- | --- | --- | --- | --- | --- |
| Component | Chemical Name | Cyan 1A | Cyan 1B | Cyan 1C | Cyan 1D |
| Pigment | Cyan Pigment | 2.00 | 2.00 | 2.00 | 2.00 |
| CN991 | Urethane Acrylate | 0.00 | 0.00 | 2.00 | 0.00 |
| SR9003 | Propoxylated (2) Neopentyl glycol Diacrylate | 3.60 | 3.60 | 3.60 | 3.60 |
| CN152 | Acrylic Oligomer | 0.00 | 0.00 | 10.00 | 0.00 |
| CN2302 | Hyperbranched Polyester Acrylate | 0.00 | 31.00 | 0.00 | 0.00 |
| CN2303 | Hyperbranched Polyester Acrylate | 30.00 | 0.00 | 17.00 | 21.00 |
| CN3100 | Acrylic Oligomer | 0.00 | 0.00 | 0.00 | 10.00 |
| CN820 | Acrylic Oligomer | 2.00 | 0.00 | 2.00 | 0.00 |
| SR285 | Tetrahydrofurfuryl Acrylate | 34.23 | 35.22 | 35.22 | 35.22 |
| SR506 | Isobornyl Acrylate | 10.00 | 10.00 | 10.00 | 10.00 |
| V-CAP | Vinyl-Caprolactam | 5.00 | 5.00 | 5.00 | 5.00 |
| ST-1 | Stabilizer | 0.10 | 0.10 | 0.10 | 0.10 |
| BYK 361N | Polyacrylate | 0.50 | 0.50 | 0.50 | 0.50 |
| BYK 377 | Polyether Modified Polydimethyl Siloxane | 0.075 | 0.075 | 0.075 | 0.075 |
| Genocure TPO | Photoinitiator | 7.00 | 7.00 | 7.00 | 7.00 |
| Irgacure 379 | Photoinitiator | 0.50 | 0.50 | 0.50 | 0.50 |
| Darocur 1173 | Photoinitiator | 3.00 | 3.00 | 3.00 | 3.00 |
| Esacure One | Photoinitiator | 2.00 | 2.00 | 2.00 | 2.00 |

As shown in table 1, the dendritic or hyperbranched polyester acrylate component comprises CN2303 and CN2302 made by Sartomer®. The oligomer component comprises CN820, CN152, CN991, and CN3100 made by Sartomer®. The monomer component consists of a tetrahydrofurfuryl acrylate called SR285 made by Sartomer®, an isobornyl acylate (IBOA), and a vinyl-caprolactam (V-CAP). The photoinitiator component comprises a Diphenyl (2,4,6-trimethylbenzoyl)phosphine oxide called Genocure TPO made by Rhan®, a Irgacure 379 and a 2,2-dimethyl-2-hydroxy-acetophenone called Darocur 1173 made by Ciba® Specialty Chemicals. The additive component comprises a leveling additive called BYK361N made by BYK Chemie®, a surfactant called BYK377 made by BYK Chemie®, and a stabilizer call ST-1 made by Albemarle®.

In this example, a pre-dispersed pigment slurry was combined with the other ingredients to produce the ink composition. A person of ordinary skill in the art will recognize, though, that the ink composition can be created with dry pigment as well.

TABLE 2

Ink Property

| | INK PROPERTY | | | |
| --- | --- | --- | --- | --- |
| Testing | Cyan 1A | Cyan 1B | Cyan 1C | Cyan 1D |
| Viscosity at 25 C. (cP), Brookfield DV-I+, 00 Spindle, 12 RPM | 25.2 | 23.1 | 23.1 | 19.5 |
| Adhesion on PSA Vinyl DPF2000 from Arlon ® | 5 | 5 | 5 | 5 |
| Curing Energy | 113 mj/cm$^2$ | 98.9 mj/cm$^2$ | 113 mj/cm$^2$ | 98.9 mj/cm$^2$ |
| Elongation | 163% | 100% | 150% | 136% |

Example 2

Example 2 describes four primary color inks generally used in the inkjet printing. The ink composition adheres to a broad range of substrates. In particular, the radiation curable ink strongly adheres to polyolefins, e.g. Coroplast, PVC, polycarbonates, polyesters, polystyrenes, ABS and textile materials, etc. The ink composition is shown in table 3 and the ink adhesion property is shown in table 4.

TABLE 3

Ink Composition

| RAW MATERIALS | | INK COMPOSITION | | | |
| --- | --- | --- | --- | --- | --- |
| Component | Chemical Name | Cyan 2A | Magenta 2B | Yellow 2C | Black 2D |
| Pigment | Pigment | 2.00 | 2.90 | 2.00 | 3.00 |
| SR9003 | Propoxylated (2) Neopentyl glycol Diacrylate | 3.60 | 10.10 | 6.00 | 8.77 |
| CN2303 | Hyperbranched PEA | 11.50 | 10.00 | 10.50 | 11.50 |
| CN820 | Acrylic Oligomer | 8.00 | 5.30 | 6.30 | 6.00 |
| SR285 | Tetrahydrofurfuryl Acrylate | 35.24 | 36.00 | 35.70 | 35.00 |
| SR506 | Isobornyl Acrylate | 11.58 | 9.67 | 12.02 | 10.15 |
| V-CAP | Vinyl-Caprolactam | 13.90 | 12.35 | 13.30 | 9.90 |
| ST-1 | Stabilizer | 0.10 | 0.10 | 0.10 | 0.10 |
| BYK 361N | Polyacrylate | 0.50 | 0.50 | 0.50 | 0.50 |
| BYK 377 | Polyether Modified Polydimethyl Siloxane | 0.075 | 0.075 | 0.075 | 0.075 |
| Genocure TPO | Photoinitiator | 8.00 | 8.00 | 8.00 | 9.50 |
| Irgacure 379 | Photoinitiator | 0.50 | 0.50 | 0.50 | 0.50 |
| Darocur 1173 | Photoinitiator | 3.00 | 2.50 | 3.00 | 3.00 |
| Esacure One | Photoinitiator | 2.00 | 2.00 | 2.00 | 2.00 |

TABLE 4

| | Ink Property | | | |
|---|---|---|---|---|
| | INK PROPERTY: ADHESION | | | |
| Substrates | Cyan 2A | Magenta 2B | Yellow 2C | Black 2D |
| PSA Vinyl DPF2000 from Arlon ® | 5 | 5 | 5 | 5 |
| 3M Controltac Vinyl 180-10 from 3M ® | 5 | 5 | 5 | 5 |
| Polycarbonate Sheet | 5 | 5 | 5 | 5 |
| Coroplast | 5 | 5 | 5 | 5 |
| Polystyrene Sheet | 5 | 5 | 5 | 5 |
| Saturn Vinyl from Avery ® | 5 | 5 | 5 | 5 |
| ABS | 5 | 5 | 5 | 5 |
| PETG Sheet (Polyethylene Terepthalate Glycol) | 5 | 5 | 5 | 5 |

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A radiation curable ink composition comprising:
   (a) at least one of a dendritic and a hyperbranched polyester acrylate component, a total amount of the dendritic and hyperbranched polyester acrylate consisting of 10-45% by weight of the ink composition;
   (b) an oligomer component;
   (c) a monomer component, wherein 85%-95% of the monomer component is comprised of mono-functional monomers; and
   (d) a photoinitiator component.

2. The ink composition of claim 1, wherein the at least one dendritic and hyperbranched polyester acrylate component has a functionality of greater than 5 in the ink composition.

3. The ink composition of claim 1, wherein the ink viscosity is not greater than 40 cP at 25° Celsius.

4. The ink composition of claim 1, wherein the ink viscosity is not greater than 30 cP at 25° Celsius.

5. The ink composition of claim 1, wherein the at least one dendritic and hyperbranched polyester acrylate component consists of 10-30% by weight of the ink composition.

6. The ink composition of claim 1, wherein the at least one dendritic and hyperbranched polyester acrylate component consists of 15-20% by weight of the ink composition.

7. The ink composition of claim 1, wherein the oligomer component consists of 1-15% by weight of the ink composition.

8. The ink composition of claim 1, wherein the oligomer component consists of 5-10% by weight of the ink composition.

9. The ink composition of claim 1, wherein the oligomer component is at least one of an acrylic oligomer, a urethane (meth)acrylate oligomer, a polyester based (meth)acrylate oligomer, a polyether based (meth)acrylate oligomer, and an epoxy (meth)acrylate oligomer.

10. The ink composition of claim 1, wherein the oligomer component has a functionality of not greater than three.

11. The ink composition of claim 1, wherein the monomer component has a functionality of not greater than two.

12. The ink composition of claim 1, wherein the photoinitiator component consists of 1-20% by weight of the ink composition.

13. The ink composition of claim 1, wherein the photoinitiator component consists of 5-15% by weight of the ink composition.

14. The ink composition of claim 1, further comprising a colorant component.

15. The ink composition of claim 14 wherein the colorant component consists of up to 20% by weight of the ink composition.

16. The ink composition of claim 1, further comprising an additive component.

17. The ink composition of claim 16, wherein the additive component consists 0.01%-2% by weight of the ink composition.

18. A method of ink jet printing comprising:
   jetting from an ink jet printer an ink composition onto a substrate, the ink composition comprising:
      a) at least one of a dendritic and a hyperbranched polyester acrylate component, a total amount of the dendritic and hyperbranched polyester acrylate component consisting of 10-45% by weight of the ink composition;
      (b) an oligomer component;
      (c) a monomer component, wherein 85%-95% of the monomer component is comprised of mono-functional monomers; and
      (d) a photoinitiator component; and
   curing the ink through exposure to radiation.

* * * * *